United States Patent [19]
Baciu et al.

[11] Patent Number: 5,205,485
[45] Date of Patent: Apr. 27, 1993

[54] APPARATUS AND METHOD OF CONTROLLING MOISTURE CONTENT WITHIN A REACTION VESSEL

[75] Inventors: Dan N. Baciu, Parsippany; Bohdan A. Wasiczko, South Orange, both of N.J.

[73] Assignee: The BOC Group, Inc., Murray Hill, N.J.

[21] Appl. No.: 904,127

[22] Filed: Jun. 25, 1992

[51] Int. Cl.⁵ .............................................. G05D 22/00
[52] U.S. Cl. .................................. 236/44 R; 236/94; 148/629; 266/257
[58] Field of Search ............... 236/44 R, 44 A, 44 E, 236/94; 374/28; 266/99, 257; 261/26, 27, DIG. 34; 148/208, 215, 216, 629, 636, 638

[56] References Cited

U.S. PATENT DOCUMENTS

| | | | |
|---|---|---|---|
| 2,815,305 | 12/1957 | Ipsen | 148/215 |
| 3,127,289 | 3/1964 | Beall | 148/601 |
| 3,269,715 | 8/1966 | Wellford, Jr. | 236/44 A X |
| 3,628,555 | 12/1971 | Nagano et al. | 236/44 A X |
| 3,925,109 | 12/1975 | Nilsen | 148/629 X |
| 4,323,191 | 4/1982 | Chiyoda et al. | 236/44 A |
| 4,497,671 | 2/1985 | Wasserman et al. | 148/629 |
| 4,890,479 | 1/1990 | Glover et al. | 236/44 A X |
| 4,909,436 | 3/1990 | Hamner et al. | 236/44 A |
| 4,992,113 | 2/1991 | Baldo et al. | 148/216 X |

*Primary Examiner*—Harry B. Tanner
*Attorney, Agent, or Firm*—Carol A. Nemetz; Larry R. Cassett

[57] ABSTRACT

Method and apparatus for controlling the dew point in a reaction vessel in which a dew point reading is converted to an electric current signal which is coordinated with a preselected dew point range and translated into a frequency which is transmitted to a device that regulates the addition of liquid water to the reaction vessel.

11 Claims, 1 Drawing Sheet

APPARATUS AND METHOD OF CONTROLLING MOISTURE CONTENT WITHIN A REACTION VESSEL

TECHNICAL FIELD

The present invention is generally directed to controlling the moisture content within a reaction vessel and particularly to a method and apparatus for converting the detected moisture content to an electric current signal which in turn is translated to a frequency which instantaneously controls the input of liquid water to the reaction vessel based on the detected moisture content.

BACKGROUND OF THE PRIOR ART

Control of the moisture content (dew point) within a reaction vessel is an important consideration, particularly in processes for the decarburization and controlled oxidation of steel. Water vapor is an effective decarburizing agent when present in controlled amounts. If insufficient water vapor is present, the process rate decreases below acceptable limits, thereby adding to the cost and time of the decarburizing operation. If excessive water vapor is present, scaling will result causing a slow down of the process.

There have been efforts to control the moisture content within a reaction vessel. For example, H. N. Ipsen, U.S. Pat. No. 2,815,305, discloses a process in which gas is continuously withdrawn from a furnace and the dew point measured. If there is an unacceptable deviation in the dew point, then the composition of the gas admitted to the furnace is changed by the use of natural gas as a regulating medium.

F. W. Beall, U.S. Pat. No. 3,127,289, discloses a method of decarburizing steel in which the atmosphere in the annealing furnace is controlled by maintaining a desired $H_2/H_2O$ equilibrium in the exit gas. The hydrogen content and/or the dew point of the incoming gas is varied while the equilibrium in the exit gas is maintained at a constant rate.

Richard M. Hamner et al., U.S. Pat. No. 4,909,436, discloses an apparatus for humidifying gases wherein a primary stream of gas of a selected pressure passes through a tube coupled to a device having a constriction therein. The constriction generates a downstream low pressure region. A controllable source of a secondary gas is operatively linked to the low pressure region. A dew point sensor is coupled to the tube downstream of the low pressure region and detects the dew point of the mixture. This dew point indication is used to manually regulate the pressure of the primary gas and the flow of secondary gas to achieve the desired dew point of the mixture. The dew point is therefore adjusted manually by moderating the temperature of the reaction vessel.

These efforts at controlling the dew point within a reaction vessel suffer from one or more drawbacks. In particular, the dew point is controlled by the injection of water vapor (steam) into the reaction vessel. Because steam is a gas, it is compressible and therefore more difficult to control. In addition, the system requires additional energy to generate the steam and greater cost because the steam is generated in a separate vessel.

The manual adjustment of the dew point is also disadvantageous because it is less accurate and more labor intensive than desirable for many applications.

It would therefore be of significant benefit to have an automated process in which a variable amount of liquid water is fed into the reaction vessel with the capability of automatically adjusting the water flow based on the input received from a dew point analyzer.

SUMMARY OF THE INVENTION

The present invention is generally directed to a method and apparatus for controlling the moisture content (dew point) within a reaction vessel. The invention comprises detecting the water vapor content within the reaction vessel. The water vapor content measurement or dew point (measured in ° C. or ° F.) is then converted to an electric current signal. The electric current signal is coordinated with a preselected range of the dew point and then translated into a frequency which is then transmitted to a device which regulates the addition of liquid water to the reaction vessel in response to the frequency reading.

BRIEF DESCRIPTION OF THE DRAWING

The following drawing is illustrative of an embodiment of the invention and is not intended to limit the invention as encompassed by the claims forming part of the application.

Referring to FIG. 1, the dew point control system 10 is shown operatively connected to a reaction vessel 12 which can be, for example, an annealing furnace for the decarburization of steel. The reaction vessel 12 must be capable of operating at a temperature sufficient to vaporize entering liquid water which is used to control the dew point by the dew point control system 10.

Figure 1:
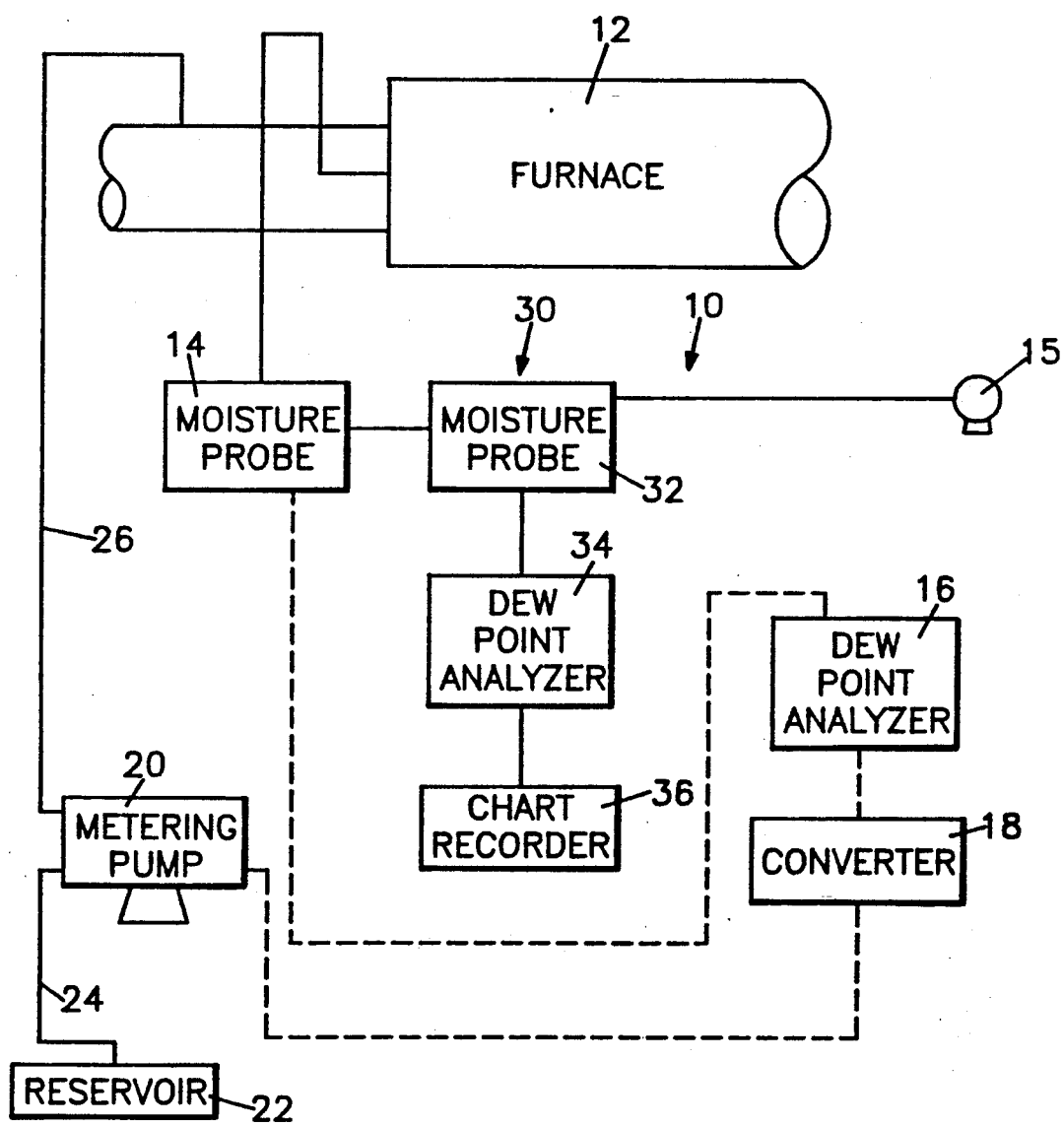
FIG. 1 is a schematic view of one embodiment of the invention for controlling the dew point of a furnace.

The dew point control system 10 includes a device 14 for measuring the moisture content of the reaction vessel 12. The atmosphere of the reaction vessel 12 is drawn into the device 14 by the vacuum created by a pump 15.

The device 14 may be, for example, a polymer moisture probe manufactured by Endress & Hauser Co., Inc. of Greenwood, Ind. The moisture probe 14 measures the relative humidity of the atmosphere obtained from the interior of the reaction vessel 12 and converts the relative humidity reading to an electric current signal. This signal is transmitted to a dew point analyzer such as rh-plus 2200 or Hydro-Twin moisture analyzer manufactured by Endress & Hauser Co., Inc.

A suitable electric current range, for example 4 to 20 mA, may be programmed into the dew point analyzer 16. The output electric current signal (e.g. 4 to 20 mA) can be programmed in accordance with the invention to correspond to an analog dew point span of a desired width. One such instrument for providing the output electric current signal at a predetermined analog dew point span is the Hydro-Twin moisture analyzer containing a polymer moisture probe.

For example, if it is desired to maintain the dew point within the range of 50° to 100° F., then the dew point analyzer 16 may be programmed to have the 50° F. temperature correspond to a 4 mA reading and the 100° F. upper limit to correspond to 20 mA.

The electric current signal from the dew point analyzer 16 is then fed to a current to frequency (inverse action) converter 18 such as Liquitron manufactured by Liquid Metronics, Inc. of Acton, Massachusetts. The converter 18 translates the electric current signal from the dew point analyzer 16 to a frequency output in an inversely proportional relationship. The frequency output signal is sent to a metering device 20 which transmits liquid water from a reservoir 22 via lines 24 and 26 to the reaction vessel 12 in accordance with the frequency output from the converter 18.

The system of the present invention operates on the general principle that when the dew point in the reaction vessel 12 increases, corresponding to an increase in the moisture content, less water is pumped to the reaction vessel 12 from the reservoir 22 in order to maintain the dew point within the desired range. Accordingly, the metering device 20 pumps at a lower rate corresponding to a relatively lower frequency signal from the converter 18.

Since the electric current signal from the dew point analyzer 16 is proportional to the relative humidity reading from the moisture probe 14, the electric current signal must be inversely proportional to the frequency output. That is, as the dew point increases and generates a correspondingly higher electric current signal, the output frequency must decrease to cause a lower flow of liquid water from the reservoir 22 to the reaction vessel 12.

If a narrow range of dew point control is desired (e.g. only about 5° F. from the highest to the lowest dew point), it is generally desirable to select the set point near the upper limit of the dew point range.

The dew point control system 10 may optionally be provided with a system which graphically displays and/or records the dew point readings over time to provide a history of the dew point control of the reaction vessel. In the embodiment shown in FIG. 1, the system 10 is provided with a second moisture probe 32 which also measures the moisture content of the reaction vessel 12 transmitted therewith by the vacuum generated by the pump 15. The second moisture probe 32 (e.g. a Chilled Mirror manufactured by General Eastern of Watertown, Mass.) transmits an electric current signal to a second dew point analyzer 34 of the same type as the dew point analyzer 16.

The dew point analyzer 34 is programmed with an electric current range (e.g. 4 to 20 mA). A corresponding electric current signal is transmitted to a chart recording device 36, manufactured by Wantanabe Inc. of Japan, which translates the electric current signal into a readable display of the dew point over time.

The following example is provided for illustrative purposes only and is not intended to limit the invention as encompassed by the claims forming part of the application.

EXAMPLE

A tip-up furnace having a volume of 1,200 ft³ was fired to a initial temperature of 1480° F. and allowed to cool to 830° F. in an atmosphere of 100% nitrogen gas. The furnace was loaded with electrical laminates and the heat treatment operation was conducted for the purpose of stress relieving and oxidizing (blueing) the surface of the laminates.

The desired dew point for this example was empirically selected to be 100° F. An analog dew point span of 99°-101° F. was chosen for the dew point analyzer to obtain a high level of control over the moisture content in the furnace. The electric current signal output of 4–20 mA was calibrated to the narrow dew point span in a known manner such that the output signal of 4 mA corresponded to a dew point of 99° F. and 20 mA corresponded to a dew point of 101° F.

The pump for supplying liquid water to the furnace was chosen based on the amount of water which must be transmitted to the furnace to maintain a 100° F. dew point level. In accordance with the present example, it was determined that a pump having a capacity in the range of from 0.63 to 63 ml/min was sufficient for providing the necessary liquid water.

The furnace was operated for 47 minutes at a steady nitrogen gas flow of 4,600 standard cubic feet/hour. The results are shown in Table 1.

TABLE 1

| Time min. | $N_2$ Flow scfh | Furnace Temper. °F. | Dew Point °F. | Probe Temper. °F. |
|---|---|---|---|---|
| 0 | 4,600 | 867 | −13.0 | 123 |
| 20 | 4,600 | 850 | 84.0 | 124 |
| 25 | 4,600 | 847 | 99.3 | 129 |
| 28 | 4,600 | 845 | 100.9 | 129 |
| 31 | 4,600 | 840 | 99.1 | 129 |
| 34 | 4,600 | 837 | 98.9 | 128 |
| 37 | 4,600 | 835 | 101.1 | 128 |
| 41 | 4,600 | 835 | 99.0 | 129 |
| 44 | 4,600 | 832 | 99.9 | 128 |
| 47 | 4,600 | 832 | 98.8 | 128 |

As shown in Table 1 dew point control became effective after about 25 minutes of operation. From that point, the variation in dew point was from 98.8° to 101.1° F. or approximately $\mp 1.2\%$. Accordingly, the present invention provides an effective means of controlling the dew point of a reaction vessel within narrow limits.

What we claim is:

1. A method of controlling the moisture content within a reaction vessel comprising:
   (a) detecting the water vapor content within the reaction vessel;
   (b) converting the water vapor content measurement into an electric current signal corresponding to a predetermined dew point range;
   (c) translating the electric current signal to a frequency output signal; and
   (d) transmitting liquid water to the reaction vessel in response to the frequency output signal.

2. The method of claim 1 wherein the electric current signal is in the range of 4 to 20 mA.

3. The method of claim 1 wherein the frequency output signal is inversely proportional to the electric current signal.

4. The method of claim wherein step (d) comprises forwarding the frequency output signal to a metering pump and pumping the liquid water to the reaction vessel at a rate corresponding to the frequency output signal.

5. The method of claim 1 further comprising recording changes in the variation of the moisture content within the reaction vessel.

6. The method of claim 1 further comprising establishing a set point for the dew point corresponding to an upper portion of the predetermined dew point range.

7. Apparatus for controlling the dew point within a reaction vessel comprising:
   (a) means for detecting the water vapor content within the reaction vessel;
   (b) means for converting the water vapor content in the reaction vessel to an electric current signal corresponding to a predetermined dew point range;

(c) means for translating the electric current signal to a frequency output signal; and (e) means for transmitting liquid water to the reaction vessel in response to the frequency output signal.

8. The apparatus of claim 7 wherein the electric current signal is in the range of 4 to 20 mA.

9. The apparatus of claim 7 wherein the means for translating the electric current signal comprises means for generating a frequency output signal inversely proportional to the electric current signal.

10. The apparatus of claim 7 further comprising means for displaying or recording the detected water vapor content over time.

11. The apparatus of claim 10 wherein the means for recording or displaying comprises a second means for detecting the water vapor content within the reaction vessel, second means for converting the water vapor content in the reaction vessel to an electric current signal, and means for translating the electric current signal into a display or recording of the water vapor content.

* * * * *